United States Patent
Harada et al.

(10) Patent No.: US 11,330,138 B2
(45) Date of Patent: May 10, 2022

(54) IMAGE SCANNING DEVICE

(71) Applicant: KYOCERA Document Solutions Inc., Osaka (JP)

(72) Inventors: Hiroyuki Harada, Osaka (JP); Shinji Hayashi, Osaka (JP); Atsushi Fujiki, Osaka (JP); Nozomu Inami, Osaka (JP); Shuichi Masui, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/030,780

(22) Filed: Sep. 24, 2020

(65) Prior Publication Data

US 2021/0099602 A1 Apr. 1, 2021

(30) Foreign Application Priority Data

Sep. 27, 2019 (JP) .............................. JP2019-177995

(51) Int. Cl.
*H04N 1/12* (2006.01)
*H04N 1/00* (2006.01)

(52) U.S. Cl.
CPC ......... *H04N 1/121* (2013.01); *H04N 1/00018* (2013.01); *H04N 1/00466* (2013.01)

(58) Field of Classification Search
CPC ........... H04N 1/00018; H04N 1/00466; H04N 1/121; H04N 1/00588; H04N 1/0066; H04N 1/00689; H04N 1/00713; H04N 1/00779; H04N 2201/0434; H04N 1/193; H04N 2201/02425; H04N 2201/03162; H04N 2201/04703; H04N 2201/04729; H04N 2201/04731; H04N 2201/04787; H04N 2201/04789; H04N 2201/04791; H04N 1/1017; H04N 1/1026; H04N 1/00384; H04N 1/00411; H04N 1/00413; H04N 1/00432; H04N 1/00474; H04N 1/00482; H04N 1/32026; H04N 1/32358; H04N 1/32464; H04N 1/32512;

(Continued)

(56) References Cited

U.S. PATENT DOCUMENTS

| 7,850,161 | B2 * | 12/2010 | Fukatsu | G03G 15/6538 270/58.12 |
| 8,074,976 | B2 * | 12/2011 | Ochi | G03G 15/6538 270/58.09 |
| 8,967,610 | B2 * | 3/2015 | Takashima | G03G 15/6582 270/58.07 |
| 9,609,159 | B2 * | 3/2017 | Hatayama | B65H 5/06 |

(Continued)

FOREIGN PATENT DOCUMENTS

JP H09-077282 3/1997

*Primary Examiner* — Negussie Worku

(57) ABSTRACT

An image scanning unit optically scans a document image of a document. A transportation device performs transportation of the document set at a front insertion-ejection port as an insertion port and ejection port of the document. A controller performs in a first scanning mode image scanning of a top sheet of the document if the document has been bound with a staple. In the first scanning mode, the controller performs image scanning of a partial scanning area in the top sheet while transporting the document using the transportation device, and reverses a transportation direction of the document at a time point that the image scanning of the partial scanning area is finished. The partial scanning area is from a front end to a predetermined position of the top sheet, and the predetermined position is a position nearer to the front end than a binding position of the staple.

6 Claims, 5 Drawing Sheets

(58) Field of Classification Search
CPC ... H04N 2201/0081; H04N 2201/0082; H04N 2201/3288; H04N 2201/02439; H04N 2201/04717; H04N 2201/04732; H04N 2201/04734; H04N 2201/04737; H04N 2201/04794; H04N 1/00602; H04N 1/00795; H04N 1/00801; H04N 1/00806; H04N 1/00811; H04N 1/047; H04N 1/1215; H04N 1/195; H04N 1/233; H04N 1/2338; H04N 1/32112; H04N 1/387; H04N 1/3877; H04N 2201/0436; H04N 2201/3212; H04N 2201/3222; H04N 2201/3242; H04N 1/00013; H04N 1/00034; H04N 1/0005; H04N 1/00082; H04N 1/1013; H04N 1/1056; H04N 1/113; H04N 1/3878; H04N 2201/0416; G03G 15/502; G03G 15/5075; G03G 2215/00126; G03G 15/602; G03G 15/6529; B65H 15/00; B65H 2301/163; B65H 2301/33312; B65H 2301/42212; B65H 2404/6111; B65H 2404/632; B65H 2801/27; B65H 2801/39; B65H 29/52; B65H 29/58; B65H 29/60; B65H 33/04; B65H 39/042; B65H 5/26; B65H 85/00
USPC .......................................................... 358/498
See application file for complete search history.

(56) References Cited

U.S. PATENT DOCUMENTS

| | | | |
|---|---|---|---|
| 2009/0207435 A1* | 8/2009 | Megawa | H04N 1/3877 358/1.15 |
| 2010/0156023 A1* | 6/2010 | Ochi | G03G 15/6538 270/58.08 |
| 2011/0164413 A1* | 7/2011 | Yamada | G02B 6/0001 362/217.05 |
| 2013/0243511 A1* | 9/2013 | Takashima | G03G 15/6582 400/605 |
| 2016/0127590 A1* | 5/2016 | Hatayama | B65H 5/06 358/498 |
| 2017/0094085 A1* | 3/2017 | Tohki | H04N 1/00474 |
| 2017/0289387 A1* | 10/2017 | Yue | B65H 5/26 |

* cited by examiner

IMAGE SCANNING DEVICE

CROSS-REFERENCE TO RELATED APPLICATIONS

This application relates to and claims priority rights from Japanese Patent Application No. 2019-177995, filed on Sep. 27, 2019, the entire disclosures of which are hereby incorporated by reference herein.

BACKGROUND

1. Field of the Present Disclosure

The present disclosure relates to an image scanning device.

2. Description of the Related Art

In an image scanning device, if a document including stapled sheets is transported to an image scanning unit by a document feeding device, the staple contacts with the image scanning unit and thereby the image scanning unit may be damaged or the document may be damaged in transportation. Therefore, an image scanning device transports a document to an image scanning unit using a document feeding device, and if a metal detector detects a staple that the document is bound with, stops the transportation of the document. Such an image scanning device restrains the damage due to the staple of the image scanning unit or the document, but can not perform image scanning of such a document.

Meanwhile, when performing image scanning of such a document, a user inserts the document to a transparent carrier sheet, sets the document with the carrier sheet on the image scanning device, and causes the image scanning device to perform image scanning of the document. Consequently, while the damage due to the staple is restrained of the image scanning unit or the document, the image scanning of such a document is performed.

As mentioned, if a carrier sheet is used, image scanning using a document feeding device can be performed of a document including stapled sheets, but the carrier sheet must be prepared and it is inconvenient.

SUMMARY

An image scanning device according to an aspect of the present disclosure includes an image scanning unit, a front insertion-ejection port, a transportation device, and a controller. The image scanning unit is configured to optically scan a document image of a document. The front insertion-ejection port is as an insertion port and ejection port of the document. The transportation device is configured to perform transportation of the document set at the front insertion-ejection port. The controller is configured to perform image scanning in a first scanning mode when performing image scanning of a top sheet of the document if the document is a document bound with a staple. In the first scanning mode, the controller (a) performs image scanning of a partial scanning area in the top sheet while transporting the document using the transportation device, and (b) reverses a transportation direction of the document at a time point that the image scanning of the partial scanning area is finished. The partial scanning area is from a front end to a predetermined position of the top sheet, and the predetermined position is a position nearer to the front end than a binding position of the staple.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
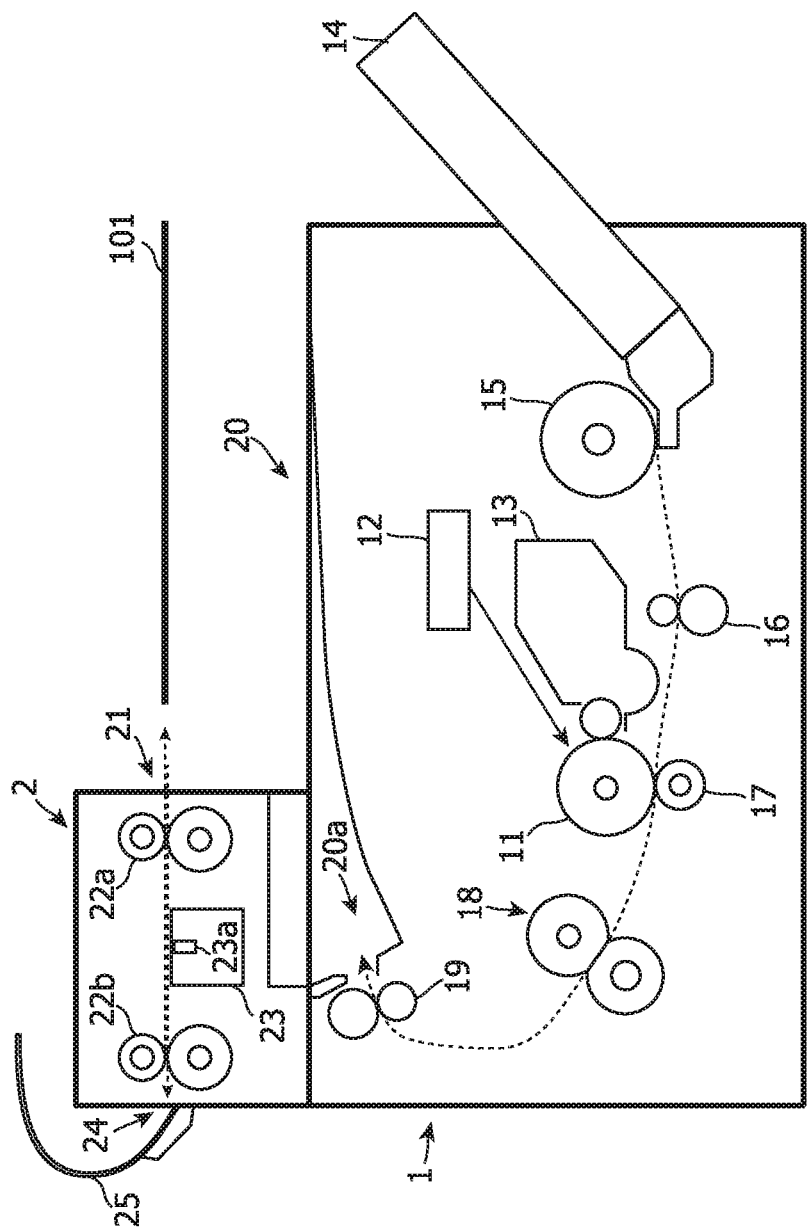
FIG. 1 shows a block diagram that indicates an example of a configuration of an image forming apparatus that includes an image scanning device according to an embodiment of the present disclosure.

FIG. 1 shows a block diagram that indicates an example of a configuration of an image forming apparatus that includes an image scanning device according to an embodiment of the present disclosure. The image forming apparatus shown in FIG. 1 is a scanner, a copier, a multi function peripheral, or the like, and includes a printing device 1 and an image scanning device 2 that are connected to each other.

The printing device 1 transports a print sheet, prints an image on the print sheet in an electrographic manner, and outputs the print sheet after the printing.

The printing device 1 includes a photoconductor drum 11, an exposure device 12, a development device 13, a sheet feeding cassette 14, a feeding roller 15, a transportation roller 16, a transfer roller 17, a fuser 18, and a transportation roller 19.

The exposure device 12 is a device that scans and irradiates the photoconductor drum 11 with laser light and thereby forms an electrostatic latent image. The photoconductor drum 11 is scanned with the laser light in a direction (a primary scanning direction) perpendicular to a rotation direction (a secondary scanning direction) of the photoconductor drum 11. The exposure device 12 includes a laser scanning unit that includes a laser diode as a light source of the laser light, optical elements (such as lens, mirror and polygon mirror) that guide the laser light to the photoconductor drum 11.

Further, a charging unit, a cleaning device, a static electricity eliminator and the like are disposed in the periphery of the photoconductor drum 11. The cleaning device removes residual toner on the photoconductor drum 11 after transferring a toner image. The static electricity eliminator eliminates static electricity of the photoconductor drum 11 after transferring a toner image.

The development device 13 adheres toner on the electrostatic latent image on photoconductor drum 11, and thereby forms a toner image. The toner is supplied from a toner hopper in a toner cartridge that contains toner.

The sheet feeding cassette 14 stores a print sheet, and for example, pushes up the print sheet using a lift plate (not shown) so as to cause the print sheet to contact with the feeding roller 15. The feeding roller 15 feeds the print sheet sheet by sheet onto a transportation path.

The transfer roller 17 causes the print sheet in transportation by the rollers 15 and 16 to contact with the photoconductor drum 11, and transfers the toner image to the print sheet. The print sheet on which the toner image has been transferred is transported to the fuser 18, and consequently, the toner image is fixed on the print sheet. Further, after the fuser 18 fixes the toner image on the print sheet, the print sheet is outputted through an outlet 20a to an output tray 20 by the transportation roller 19.

The output tray 20 is an output tray of a print sheet outputted from the printing device 1. In this embodiment, the image scanning device 2 is arranged on a top surface of a housing of the print sheet 1, and the output tray 20 is formed on the top surface.

The image scanning device 2 optically scans a document image of a document. The image scanning device 2 includes a front insertion-ejection port 21, transportation rollers 22a and 22b, an image scanning unit 23, a rear ejection port 24, and a turn-back guide member 25.

The front insertion-ejection port 21 is arranged on a front face of the image scanning device 2, and is an opening to which a document is inserted as a target of image scanning.

The transportation rollers 22a and 22b transport the document inserted to the front insertion-ejection port 21. The transportation rollers 22a and 22b are driven by an unshown driving device (motor or the like). The transportation rollers 22a and 22b and the driving device act as a transportation device for a document set to the front insertion-ejection port 21.

The image scanning unit 23 optically scans a document image of a document. Specifically, the image scanning unit irradiates the incoming document transported by the transportation rollers 22a and 22b with light, and detects reflection light from the document using a line sensor 23a and thereby generates image data of the document image.

Further, the front insertion-ejection port 21 is an insertion port for a document and is also an ejection port for a document bound with a staple; and the rear ejection port 24 is an ejection port for a normal sheet document among documents.

The turn-back guide member 25 is a member that guides to a front face side of the image scanning device 2 a sheet outputted through the rear ejection port 24, here a member having a curved-plate shape.

Figure 2:
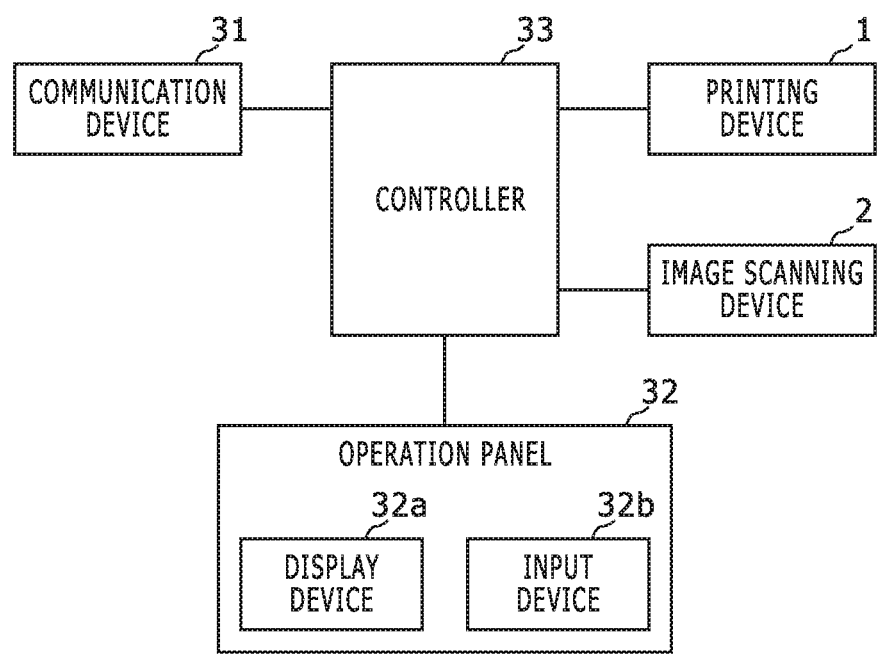
FIG. 2 shows a block diagram that indicates an electronic configuration of the image forming apparatus shown in FIG. 1.

FIG. 2 shows a block diagram that indicates an electronic configuration of the image forming apparatus shown in FIG. 1. As shown in FIG. 2, the present image forming apparatus further includes a communication device 31, an operation panel 32, and a controller 33. In this embodiment, the communication device 31, the operation panel 32 and the controller 33 are arranged in the outside of the image scanning device 2. Alternatively, the communication device 31, the operation panel 32 and the controller 33 may be arranged in the inside of the image scanning device 2.

The communication device 31 is a device that performs data communication with an external device. The communication device 31 is a peripheral device interface, a network interface, or the like. The operation panel 32 is arranged on a surface of a housing of the image forming apparatus, and includes a display device 32a that displays sorts of information to a user and an input device 32b that detects a user operation. For example, the display device 32a includes a liquid crystal display and/or the like, and the input device 32b includes a touch panel, a hard key and/or the like.

The controller 33 includes a processor such as a computer and/or an ASIC (Application Specific Integrated Circuit), and performs a software process and/or a hardware process using the processor and thereby controls the printing device 1, the image scanning device 2 and the like for a scanning operation, a copy operation or the like.

Figure 3:
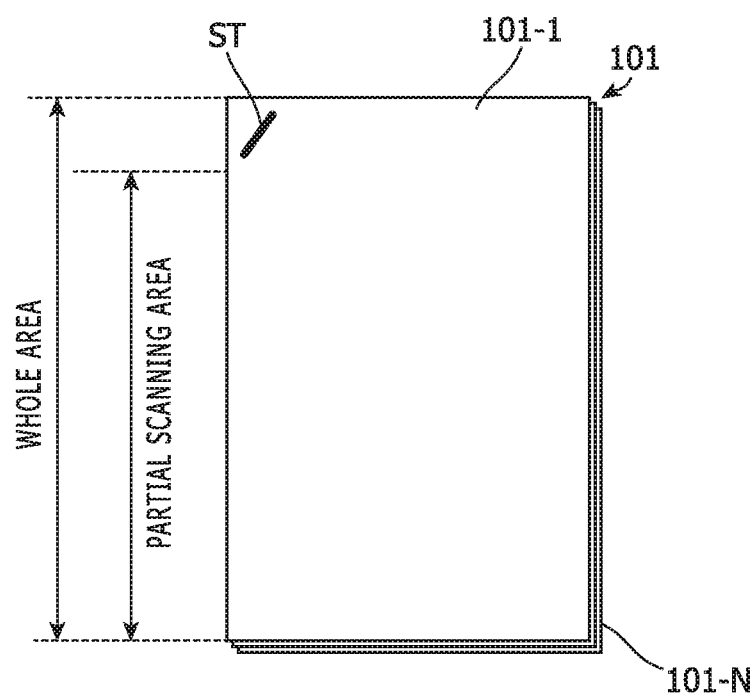
FIG. 3 shows a diagram that indicates an example of a document bound with a staple.
Figure 4:
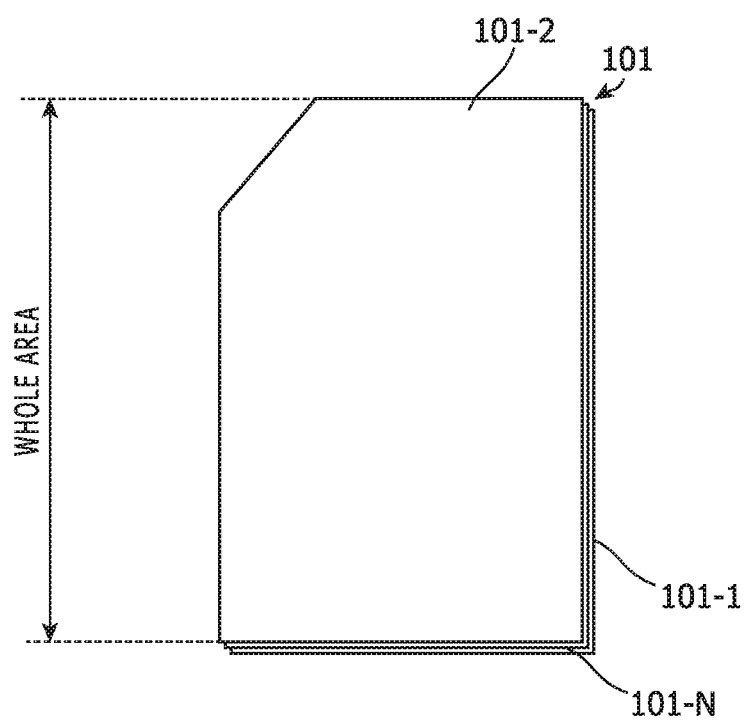
FIG. 4 shows a diagram that indicates a status that a second sheet 101-2 in the document shown in FIG. 3 is exposed.

FIG. 3 shows a diagram that indicates an example of a document bound with a staple. FIG. 4 shows a diagram that indicates a status that a second sheet 101-2 in the document shown in FIG. 3 is exposed.

Specifically, if the document is a document 101 bound with a staple ST, as shown in FIG. 3, the controller 33 performs image scanning in a first scanning mode when performing image scanning of a top sheet 101-1 of the document 101 (i.e. a sheet on which the staple ST is exposed); and in the first scanning mode, the controller 33 (a) performs image scanning of a partial scanning area in the top sheet 101-1 while transporting the document 101 using the aforementioned transportation device, and (b) reverses a transportation direction of the document 101 at a time point that the image scanning of the partial scanning area is finished. Here, the partial scanning area is from a front end to a predetermined position of the top sheet 101-1, and this predetermined position is a position nearer to the front end than a binding position of the staple ST. Thus, the document is transported in a switch back manner such that the staple ST of the document 101 does not reach the line sensor 23a of the image scanning unit 23.

Here, the aforementioned predetermined position is a fixed value preset correspondingly to a size of the document (e.g. a position away from the front end by 80 percent of an entire length of the document). Further, the aforementioned predetermined position may be a value specified by a user operation to the input device 32b. Furthermore, a sensor that detects a rear end of the document 101 may be installed at a position in front of the line sensor 23a in the transportation path of the document 101; the aforementioned predetermined position may be set as a position away from the rear end by a distance from the arrangement position of the installed sensor to the line sensor 23a (or a distance obtained by subtracting a fixed value from this distance); and the controller 33 may reverse the transportation direction of the document 101 at a time point that the installed sensor detects the rear end (or at a time point delayed from this time point by a time obtained by dividing the aforementioned fixed value by a linear velocity of the document 101. In this case, the aforementioned predetermined position is set as a position away from the rear end of the document 101 by a fixed distance, regardless of a size of the document.

Furthermore, if the target document is a document 101 bound with a staple ST, when performing image scanning of a sheet other than the top sheet 101-1 (for example, a second sheet 101-2 shown in FIG. 4), the controller 33 performs the image scanning in a second scanning mode; and in the second scanning mode, the controller 33 (c) performs image scanning of a whole area (i.e. from the front end to a rear end) of the current sheet while transporting the document 101 using the aforementioned transportation device, and (d) reverses a transportation direction of the document 101 at a time point that the image scanning of the whole area is finished.

After reversing the transportation direction of the document 101, the controller 33 (a) may cause the transportation device to entirely output the document 101 from the front insertion-ejection port 21 to the output tray 20, and alternatively, (b) may terminate the transportation of the document 101 in a status that one end part of the document is exposed to an outside of the front insertion-ejection port and the transportation roller 22a in the transportation device nips the other end part of the document 101.

Furthermore, if the first scanning mode is selected, the controller 33 may automatically determine that the document 101 is a document including plural sheets and automatically perform a continuous scanning mode that continuously performs image scanning of the plural sheets in the document. In the continuous scanning mode, a series of document images continuously scanned is considered as images obtained from a single document, and printed in a copy operation or converted to a single data file in a scan operation.

Figure 5A:
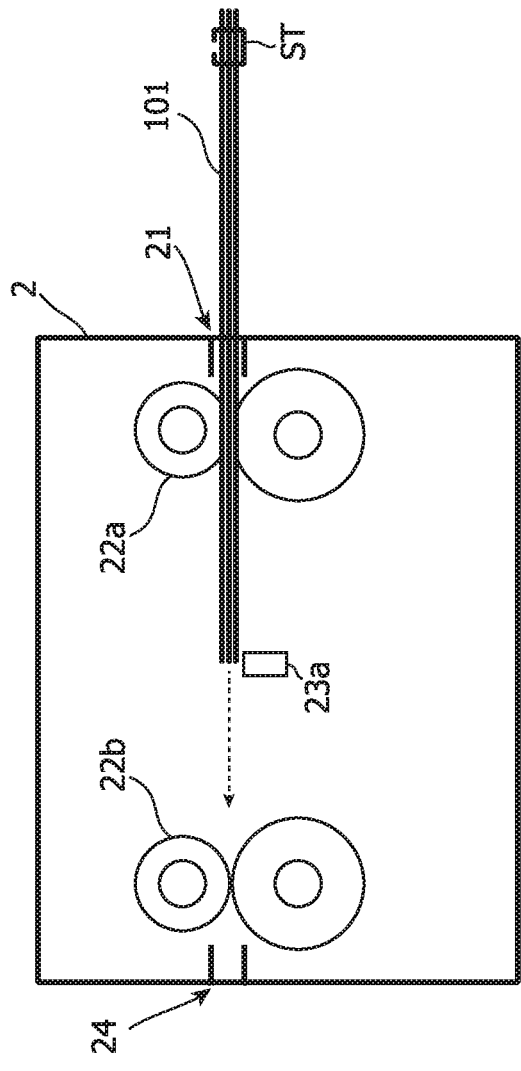
FIGS. 5A and 5B show a behavior of the image scanning device 2 shown in FIGS. 1 and 2.
Figure 5B:
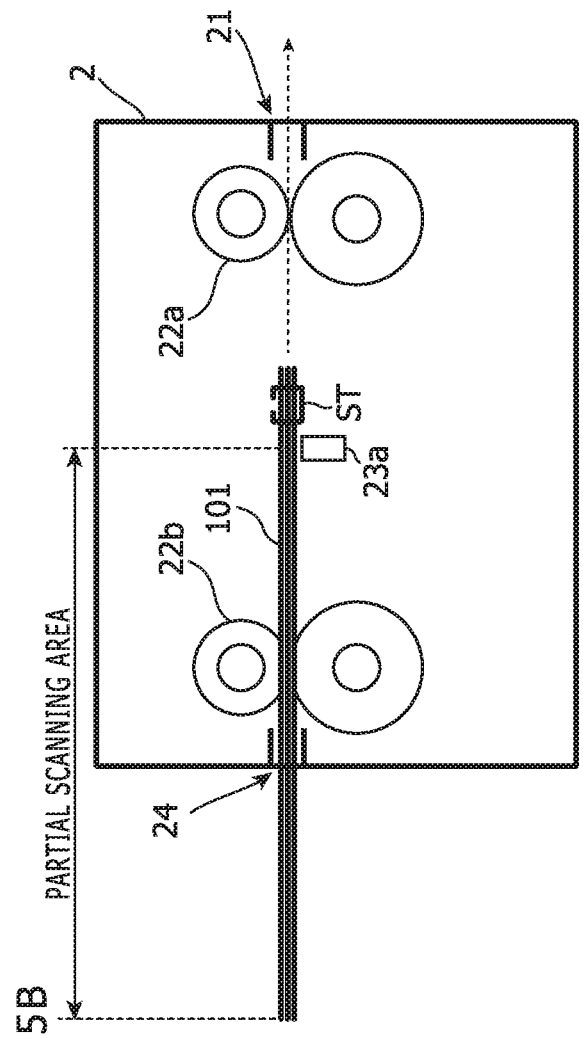

The following part explains a behavior of the aforementioned image scanning device 2. FIGS. 5A and 5B show a behavior of the image scanning device 2 shown in FIGS. 1 and 2. FIG. 5A indicates transportation before finishing image scanning of the first sheet. FIG. 5B indicates transportation after finishing image scanning of the first sheet.

A user performs a predetermined operation to the operation panel 32 to cause the image scanning device 2 to perform image scanning in a staple mode, and inserts to the front insertion-ejection port 21 a document 101 bound with a staple ST.

After detecting the aforementioned user operation using the input device 32b, when a sensor (not shown) detects that the document 101 is put between the transportation rollers 22a through the front insertion-ejection port 21, the controller 33 determines that the document 101 set in this manner is a document bound with a staple ST, and in the staple mode, electrically controls the aforementioned driving device (not shown) and thereby drives the transportation rollers 22a and 22b and performs transportation of the document to the image scanning unit 23. In the staple mode, the front insertion-ejection port 21 is used as an ejection port for the document 101.

The line sensor 23a in the image scanning unit 23 scans an image of the document 101 that passes on the line sensor 23a, and the image scanning unit 23 outputs image data of this image to the controller 33 using a processing circuit (not shown). In a copy operation, this image data is used for printing, and in a scan operation, this image data is transmitted or stored as a data file.

In the staple mode, when performing image scanning of a first sheet 101-1, as shown in FIG. 5A for example, the controller 33 starts transportation of the document 101 and performs image scanning in the first scanning mode, terminates the image scanning in a middle of the sheet 101-1 so as not to contact the staple ST with the line sensor 23a as mentioned, and returns the document 101 to the front insertion-ejection port 21 with switch-back transportation as shown in FIG. 5B for example.

In this process, the number of lines obtained in the image scanning is smaller than the number of lines obtained in image scanning of a whole area of the sheet, and therefore, a document image obtained in the image scanning of the first sheet 101-1 may be padded with lines having a predetermined pixel value so as to make the number of lines of the document image identical to the number of lines obtained in image scanning of the whole area.

In this case, the number of lines obtained in image scanning of the whole area may be a value corresponding to a size of the document, or may be determined in image scanning of a subsequent sheet such as the second sheet 101-2. If the number of lines obtained in image scanning of the whole area is determined in image scanning of a subsequent sheet such as the second sheet 101-2, the aforementioned padding is performed after the number of lines of the whole area is determined.

After finishing the image scanning of the first sheet 101-1, as shown in FIG. 4, the user turns the sheet 101-1 and arranges it behind the last sheet 101-N and thereby exposes a next sheet 101-2, and inserts the document 101 to the front insertion-ejection port 21 in the same manner.

Subsequently, the controller 33 causes the image scanning device 2 to perform image scanning of the next sheet 101-2 in the second scanning mode, and returns the document 101 to the front insertion-ejection port 21 with switch-back transportation after finishing image scanning of a whole area of this sheet. In this process, as shown in FIG. 4, the staple ST is covered by the top sheet 101-1 and thereby is not exposed, and therefore, in the second scanning mode, even though image scanning is performed of the whole area of the sheet 101-2, the staple ST does not directly contact with the line sensor 23a.

In the aforementioned manner, in the staple mode, the image scanning is repeatedly performed of sheets 101-i in the single document 101 in turn, until the last sheet 101-N.

If the staple mode is not applied (i.e. in case of a sheet document including only one sheet), the controller 33 outputs the document through the rear ejection port 24 using the aforementioned transportation device.

As mentioned, in Embodiment 1, the image scanning device 2 includes the image scanning unit 23 that optically scans a document image from a document, and the front insertion-ejection port 21 as an insertion port and ejection port of the document. Further, if the document is a document bound with a staple, then the controller 33 performs image scanning in a first scanning mode when performing image scanning of a top sheet of the document; and in the first scanning mode, the controller 33 (a) performs image scanning of a partial scanning area while transporting the document using the transportation device, and (b) reverses a transportation direction of the document at a time point that the image scanning of the partial scanning area is finished. The partial scanning area is from a front end to a predetermined position of the top sheet, and the predetermined position is a position nearer to the front end than a binding position of the staple.

Consequently, without a carrier sheet, image scanning can be performed of a stapled document including plural sheets.

Embodiment 2

In Embodiment 2, the image scanning device 2 further includes a staple detecting sensor that detects a staple ST in a document 101. The staple detecting sensor is arranged at a predetermined arrangement position in a transportation path from the front insertion-ejection port 21 to the image scanning unit 23 (line sensor 23a), and detects a staple ST in the document 101 that passes through the predetermined arrangement position. For example, the staple detecting sensor generates a magnetic field using an antenna or the like, and detects a staple ST on the basis of change of the magnetic field due to the staple ST.

Further, in Embodiment 2, upon detecting the staple ST using the staple detecting sensor, the controller 33 automatically and immediately applies the first scanning mode. Thus, even if the staple mode is not specified by a user operation, the image scanning is automatically performed in the staple mode.

In Embodiment 2, if the staple detecting sensor detects the staple, the controller 33 may inquire of a user whether the first scanning mode should be immediately applied or not, and the controller 33 may immediately apply the first scanning mode in accordance with a response from the user. In this case, for example, upon detecting the staple ST using the staple detecting sensor, the controller temporarily stops transportation of the document and displays on the display device 32a in the operation panel 32 a screen that causes the user to select whether the first scanning mode should be applied or the image scanning should be canceled; and if a user operation to select that the first scanning mode should be applied is detected using the input device 32b, then the controller 33 immediately applies the first scanning mode and resumes the transportation of the document.

Contrarily, if a user operation to select that the image scanning should be canceled is detected using the input device 32b, then the controller 33 immediately reverses a transportation direction of the document using the aforementioned transportation device, and outputs the document through the front insertion-ejection port 21. In this case, after the user removes the staple ST from the document or inserts the document to a carrier sheet, the user can try the image scanning again.

Other parts of the configuration and behaviors of the image scanning device 2 in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the printing device 1 is connected to the image scanning device 2. Alternatively, the printing device 1 may not be connected to the image scanning device 2.

What is claimed is:

1. An image scanning device, comprising:
    an image scanning unit configured to optically scan a document image of a document;
    a front insertion-ejection port as an insertion port and ejection port of the document;
    a transportation device configured to perform transportation of the document set at the front insertion-ejection port; and
    a controller configured to perform image scanning in a first scanning mode when performing image scanning of a top sheet of the document if the document is a document bound with a staple;
    wherein in the first scanning mode, the controller (a) performs image scanning of a partial scanning area in the top sheet while transporting the document using the transportation device, and (b) reverses a transportation direction of the document at a time point that the image scanning of the partial scanning area is finished;
    the partial scanning area is from a front end to a predetermined position of the top sheet; and
    the predetermined position is a position nearer to the front end than a binding position of the staple.

2. The image scanning device according to claim 1 wherein
    if the document is a document bound with a staple, when performing image scanning of a sheet other than the top sheet, the controller performs the image scanning in a second scanning mode; and
    in the second scanning mode, the controller (c) performs image scanning of a whole area from the front end to a rear end of the current sheet while transporting the document using the transportation device, and (d) reverses a transportation direction of the document at a time point that the image scanning of the whole area is finished.

3. The image scanning device according to claim 1 wherein after reversing the transportation direction of the document, the controller terminates the transportation of the document in a status that one end part of the document is exposed to an outside of the front insertion-ejection port and a transportation roller in the transportation device nips the other end part of the document.

4. The image scanning device according to claim 1, further comprising a staple detecting sensor;
    wherein the staple detecting sensor is arranged at a predetermined arrangement position in a transportation path from the front insertion-ejection port to the image scanning unit, and detects a staple in the document that passes through the predetermined arrangement position; and
    if the staple detecting sensor detects the staple, the controller immediately applies the first scanning mode.

5. The image scanning device according to claim 1, further comprising a staple detecting sensor;
    wherein the staple detecting sensor is arranged at a predetermined arrangement position in a transportation path from the front insertion-ejection port to the image scanning unit, and detects a staple in the document that passes through the predetermined arrangement position; and
    if the staple detecting sensor detects the staple, the controller inquires of a user whether the first scanning mode should be immediately applied or not, and the controller immediately applies the first scanning mode in accordance with a response from the user.

6. The image scanning device according to claim 1 wherein if the first scanning mode is selected, the controller automatically determines that the document is a document including plural sheets and automatically performs a continuous scanning mode that continuously performs image scanning of the plural sheets in the document.

* * * * *